United States Patent [19]

Röhm,

[11] Patent Number: 4,880,246
[45] Date of Patent: Nov. 14, 1989

[54] SELF-TIGHTENING DRILL CHUCK

[76] Inventor: Günter H. Röhm, Heinrich-Röhm-Strasse 50, D-9727 Sontheim, Fed. Rep. of Germany

[21] Appl. No.: 274,384

[22] Filed: Nov. 21, 1988

[30] Foreign Application Priority Data

Nov. 19, 1987 [DE] Fed. Rep. of Germany ....... 3739165

[51] Int. Cl.⁴ ............................................. B23B 31/12
[52] U.S. Cl. ...................................... 279/1 K; 279/60
[58] Field of Search ............................ 279/1 K, 60–65; 408/240

[56] References Cited

U.S. PATENT DOCUMENTS

| | | | |
|---|---|---|---|
| 3,237,955 | 3/1966 | McCarthy et al. | 408/240 X |
| 3,807,745 | 4/1974 | Bent | 279/62 X |
| 4,527,809 | 7/1985 | Umbert | 279/60 X |

FOREIGN PATENT DOCUMENTS

| | | | |
|---|---|---|---|
| 3434112 | 3/1986 | Fed. Rep. of Germany | 279/60 |
| 165249 | 6/1921 | United Kingdom | 279/63 |

Primary Examiner—Steven C. Bishop
Attorney, Agent, or Firm—Herbert Dubno; Andrew Wilford

[57] ABSTRACT

A self-tightening drill chuck has a chuck body adapted to be mounted on a drill spindle for rotation about an axis and formed with substantially cylindrical front and a rear outer surfaces both centered on the axis and axially offset from each other and with an outwardly open groove between the front and rear surfaces. A tightening sleeve surrounding the body is formed with substantially cylindrical front and rear inner surfaces both centered on the axis and riding on the front and rear surfaces of the body and with an inwardly open groove between the front and rear inner surfaces and forming with the groove of the body an annular generally circular-section passage This sleeve also is unitarily formed with a rearwardly flared substantially frustoconical seat also centered on the axis. Rollers riding in the grooves support the sleeve on the body so as to permit relative rotation of the body and sleeve about the axis while preventing relative axial displacement. A jaw guide in the sleeve is formed with a plurality of axially forwardly open and angularly spaced slots carrying respective jaws axially and radially displaceable in the slots and on the seat. A spring unit braced axially between the guide and the chuck body urges the guide axially forward and presses the jaws axially forward against the seat.

6 Claims, 2 Drawing Sheets

SELF-TIGHTENING DRILL CHUCK

FIELD OF THE INVENTION

The present invention relates to a self-tightening chuck. More particularly this invention concerns such a chuck used in a power drill.

BACKGROUND OF THE INVENTION

A standard self-tightening drill chuck normally has a chuck body adapted to be mounted on a drill spindle for rotation about an axis and formed with substantially cylindrical front and a rear outer surfaces both centered on the axis and axially offset from each other and with an outwardly open groove between the front and rear surfaces. A tightening sleeve surrounding the body is formed with substantially cylindrical front and rear inner surfaces both centered on the axis and riding on the front and rear surfaces of the body and with an inwardly open groove between the front and rear inner surfaces and forming with the groove of the body an annular generally circular-section passage. The cylindrical surfaces keep the sleeve and chuck body centered on each other. The front part of this sleeve, which is typically made of several pieces, is formed with a rearwardly flared substantially frustoconical seat also centered on the axis. Rollers riding in the grooves support the sleeve on the body so as to permit relative rotation of the body and sleeve about the axis while preventing relative axial displacement. A jaw guide in the sleeve is formed with a plurality of axially forwardly open and angularly spaced slots in which respective jaws that also ride on the seat are axially and radially displaceable.

As described in German patent application P 5134 the seat is formed by a separate sleeve that is threaded onto the front end of the tightening sleeve. Thus the accuracy of the centering of the jaws, which is largely determined by the location of the center of rotation of the frustoconical jaw seat, is in large part determined by the tolerances of the screwthread connection between the jaw-seat sleeve and the tightening sleeve. In order to simplify this construction it has been suggested to form the jaw guide unitarily with the tightening sleeve and to form on the outside of the jaw guide a forwardly tapered frustoconical surface that fits complementary in the jaw seat and, therefore, centers the jaw-seat sleeve. Such a system does not ensure perfectly accurate centering of the jaws, however, so that the bit held thereby rotates offcenter and bores inaccurately.

In another suggested solution the tightening sleeve engages around the roller bearing with a radially inwardly projecting flange on the chuck body. The jaw-seat sleeve is also threaded with the tensioning sleeve and the jaw guide is separate from the tensioning sleeve and locked axially between the flange of the chuck body and the inner seat surface of the jaw-seat sleeve. This system eliminates the front guide surface for the tightening sleeve so that it also does not accurately center the jaws, and the threads once again also weaken the connection between the jaw-seat and tightening sleeves.

OBJECTS OF THE INVENTION

It is therefore an object of the present invention to provide an improved self-tightening chuck.

Another object is the provision of such an improved self-tightening chuck which overcomes the above-given disadvantages, that is which is constructed so that the jaws and the bit held by them are always perfectly centered and so that it is durable and has a long service life.

SUMMARY OF THE INVENTION

These objects are attained according to this invention in a self-tightening drill chuck having a chuck body adapted to be mounted on a drill spindle for rotation about an axis and formed with substantially cylindrical front and a rear outer surfaces both centered on the axis and axially offset from each other and with an outwardly open groove between the front and rear surfaces. A tightening sleeve surrounding the body is formed with substantially cylindrical front and rear inner surfaces both centered on the axis and riding on the front and rear surfaces of the body and with an inwardly open groove between the front and rear inner surfaces and forming with the groove of the body an annular generally circular-section passage. This sleeve also is unitarily formed with a rearwardly flared substantially frustoconical seat also centered on the axis. Rollers riding in the grooves support the sleeve on the body so as to permit relative rotation of the body and sleeve about the axis while preventing relative axial displacement. A jaw guide in the sleeve is formed with a plurality of axially forwardly open and angularly spaced slots carrying respective jaws axially and radially displaceable in the slots and on the seat. A spring unit braced axially between the guide and the chuck body urges the guide axially forward and presses the jaws axially forward against the seat.

Thus with the system of this invention the sleeve forming the jaw seat as well as the inner and outer cylindrical guide surfaces can be formed in the same turning operation, that is by the same lathe in the same production step, so all these surfaces will be absolutely perfectly coaxial. The sleeve will ride perfectly on center on the chuck body, which is similarly turned in one operation so its outer cylindrical guide surfaces are also perfectly coaxial, and the jaws will ride on the perfectly coaxial frustoconical jaw seat. The jaw guide therefore serves basically to keep the jaws angularly offset in the desired position, and itself is kept tightly in place on the jaw seat by the spring.

Thus according to this invention the guide has a substantially cylindrical rear outer surface centered on the axis and riding on the front inner surface of the sleeve and a frustoconical front outer surface complementary to and riding on the frustoconical surface of the sleeve. This ensures that the guide stays centered, being continuously pushed forward by the spring unit. Furthermore the guide and sleeve are formed with radially confronting pockets and the chuck is provided with a locking element engaged in both pockets and rotationally coupling the sleeve and guide. This locking element can permit a relatively great amount of relative axial displacement of the guide and sleeve without in any way deleteriously affecting performance of the chuck.

In accordance with a further feature of this invention the passage is generally of circular section with a center and the sleeve is formed with a radially throughgoing generally circular-section fill hole of a diameter at least as great as the passage and centered on an axis offset relative to the chuck-body axis from the center of the passage section. The fill hole has relative to the chuck body axis one side that meets the passage at a location spaced angularly relative to the passage-section center at least 30° outward of a plane parallel to the chuck-body axis. Furthermore the fill hole has an inner cylindrical portion of at least the same diameter as the passage and extending at an angle between the fill-hole axis and the passage and the grooves are substantially of semicircular section and the rollers are spherical balls.

DESCRIPTION OF THE DRAWING

The above and other objects, features, and advantages will become more readily apparent from the following, reference being made to the accompanying drawing in which.

SPECIFIC DESCRIPTION

Figure 1:
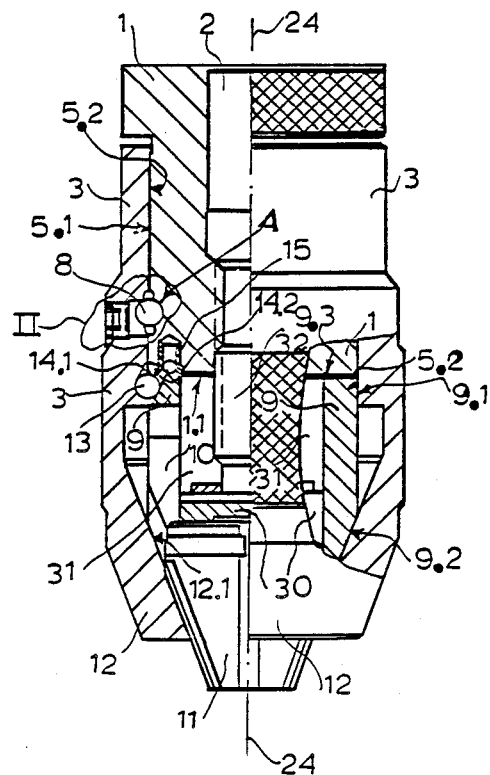
FIG. 1 is a partly axially sectioned side view of the chuck according to this invention.

As seen in FIG. 1 a chuck according to this invention has a chuck body 1 generally centered on an axis 24 and formed with an axially rearwardly open bore 2 adapted to receive a not illustrated drill spindle. A tightening sleeve 3 also centered on the axis 24 is rotatably supported on the body-1 by a roller bearing 4. The body 1 is formed to each side of the bearing 4 with a cylindrical surface 5.1 and the sleeve 3 with complementary surfaces 5.2 that center these two elements relative to each other.

The roller bearing 4 is formed by balls 8 riding in a circular-section passage 7 formed by semicircular-section grooves 6.1 and 6.2 that subdivide the respective surfaces 5.1 and 5.2 into axially front and rear portions. This bearing 4 therefore ensures easy rotation of the sleeve 3 on the body 1 while inhibiting any axial movement of the sleeve 3 relative to the body 1.

In addition the chuck is provided with a steel one-piece jaw guide 9 formed with three axially forwardly open and angularly equispaced slots 10 each receiving a respective standard jaw 11. These jaws 11 are basically wedge-shaped and also ride on an axially centered and rearwardly flared frustoconical seat 12.1 formed on a front part 12 of the sleeve 3, this part 12 being integrally formed with the sleeve 3 in accordance with this invention. The jaw guide 9 has a cylindrical outer surface 9.1 that rides on the front portion of the surface 5.2 of the sleeve and a frustoconical front surface 9.2 that is complementary to and rides on the surface 12.1. In addition the guide 9 and sleeve 3 are formed with axially pockets or recesses 14.1 and 14.2 in which is received a locking element 13 in the form of a ball that serves to angularly couple the guide 9 to the sleeve 3, so that the jaws 11 are also rotationally coupled to the sleeve 3. The pockets 14.1 and 14.2 are axially rearwardly open slots so that they do not impede limited axial movement of the guide 9 in the sleeve 3.

The guide 9 is urged continuously axially forward by an annular spring unit 15 basically comprising a forwardly open U-section washer containing a plurality of spring elements bearing on a planar and annular rear face 9.3 of the guide 9. This spring unit 15 therefore holds the front surface 9.2 of the guide 9 in tight axial contact with the surface 12.1.

The jaws 11 are displaced axially by an element 30 received in the central open space 31 of the guide 9 and having a rearwardly projecting threaded stem 32 threaded into the front portion of the bore 2 of the body 1. The front end of the element 30 fits with the jaws 11 and or the seats 12 so as to be rotationally coupled to the sleeve 3. Thus rotation of the sleeve 3 relative to the body 1 moves the body 30 axially and, on forward movement of the body 30, moves the jaws 11 toward one another, and, on rearward movement of the body 30 moves the jaws 11 apart, there normally being weak springs braced angularly between the jaws 11 continuously pressing them apart.

Figure 2:
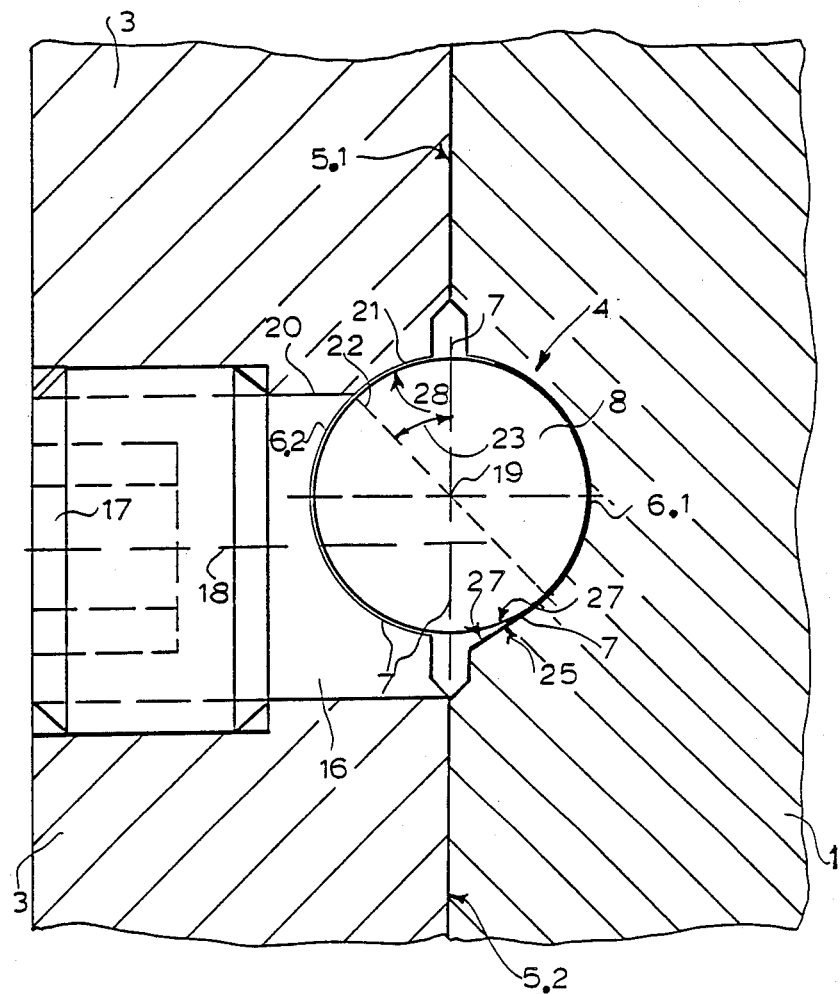
FIG. 2 is a large-scale view of the detail indicated at II in FIG. 1.

As best seen in FIG. 2 the balls 8 of the bearing 4 are admitted to the passage 7 via a circular-section threaded fill hole 16 normally blocked by a countersunk plug 17 and extending along an axis 18 extending radially of the axis 24 but axially offset from the centerline 19 of the passage 7. Thus the wall 20 of the hole 16 intersects the wall 21 of the groove 6.2 at a location 22 forming an angle 23 with a line parallel to the axis 24, the angle 23 being equal to 30° and centered on the centerline 19. The opposite side 25 from this location 22 the wall 26 of the groove 6.1 is formed with an angled cylindrical passage 27 whose radius is generally equal to that of the balls 8, whereas that of the passage 16.

With this system, therefore, the sleeve 3 can be very accurately machined with all the various riding and support surfaces so that the jaws will always be perfectly on center. The construction is very strong and inexpensive to make.

I claim:

1. A self-tightening drill chuck comprising:
   a chuck body adapted to be mounted on a drill spindle for rotation about an axis and formed with substantially cylindrical front and a rear outer surfaces both centered on the axis and axially offset from each other and with an outwardly open groove between the front and rear surfaces;
   a tightening sleeve surrounding the body and formed with substantially cylindrical front and rear inner surfaces both centered on the axis and riding on the front and rear surfaces of the body and with an inwardly open groove between the front and rear inner surfaces and forming with the groove of the body an annular generally circular-section passage, the sleeve also being unitarily formed with a rearwardly flared substantially frustoconical seat also centered on the axis;
   rollers riding in the grooves and supporting the sleeve on the body so as to permit relative rotation of the body and sleeve about the axis while preventing relative axial displacement;
   a jaw guide in the sleeve formed with a plurality of axially forwardly open and angularly spaced slots;
   respective jaws axially and radially displaceable in the slots and on the seat; and
   spring means braced axially between the guide and the chuck body for urging the guide axially forward and pressing the jaws axially forward against the seat.

2. The chuck defined in claim 1 wherein the guide has a substantially cylindrical rear outer surface centered on the axis and riding on the front inner surface of the sleeve and a frustoconical front outer surface complementary to and riding on the frustoconical surface of the sleeve.

3. The chuck defined in claim 1 wherein the guide and sleeve are formed with radially confronting pockets, the chuck further comprising
   a locking element engaged in both pockets and rotationally coupling the sleeve and guide.

4. The chuck defined in claim 1 wherein the passage is generally of circular section with a center and the sleeve is formed with a radially throughgoing generally circular-section fill hole of a diameter at least as great as the passage and centered on an axis offset relative to the chuck-body axis from the center of the passage section, the fill hole having relative to the chuck body axis one side that meets the passage at a location spaced angularly relative to the passage-section center at least 30° outward of a plane parallel to the chuck-body axis.

5. The chuck defined in claim 4 wherein the fill hole has an inner cylindrical portion of at least the same diameter as the passage and extending at an angle between the fill-hole axis and the passage.

6. The chuck defined in claim 1 wherein the grooves are substantially of semicircular section and the rollers are spherical balls.

* * * * *